(12) United States Patent
Bennett et al.

(10) Patent No.: US 12,000,697 B2
(45) Date of Patent: Jun. 4, 2024

(54) SURFACE PROFILE MEASURING INSTRUMENT AND METHOD

(71) Applicant: Elcometer Limited, Manchester (GB)

(72) Inventors: Neil James Leonard Bennett, Cheshire (GB); Jonathan Bouis, Manchester (GB); Michael Carrington Sellars, Cheshire (GB); Thomas Partington, Leeds (GB)

( * ) Notice: Subject to any disclaimer, the term of this patent is extended or adjusted under 35 U.S.C. 154(b) by 0 days.

(21) Appl. No.: 16/647,446

(22) PCT Filed: Sep. 19, 2018

(86) PCT No.: PCT/GB2018/052679
§ 371 (c)(1),
(2) Date: Mar. 13, 2020

(87) PCT Pub. No.: WO2019/058118
PCT Pub. Date: Mar. 28, 2019

(65) Prior Publication Data
US 2020/0278191 A1 Sep. 3, 2020

(30) Foreign Application Priority Data
Sep. 19, 2017 (GB) ..................... 1715079

(51) Int. Cl.
*G01B 7/287* (2006.01)
(52) U.S. Cl.
CPC ................... *G01B 7/287* (2013.01)
(58) Field of Classification Search
CPC .......... G01B 7/287; G01B 7/28; G01Q 20/00; G01Q 10/06; Y10S 977/865;
(Continued)

(56) References Cited

U.S. PATENT DOCUMENTS 5,436,448 A * 7/1995 Hosaka ..................... G11B 5/00
977/851
5,670,712 A * 9/1997 Cleveland .............. G01Q 20/00
977/872
(Continued)

FOREIGN PATENT DOCUMENTS

DE 2707023 8/1977
EP 2 754 993 7/2014
(Continued)

OTHER PUBLICATIONS

M.P.Blodget, C.V.Ukpabi, P.B.Nagy: "Surface Roughness Influence on Eddy Current Electrical Conductivity Measurements", Materials Evaluation, vol. 61, No. 6, Jun. 1, 2003, pp. 765-772, XP002786624.
(Continued)

*Primary Examiner* — Alexander Satanovsky
*Assistant Examiner* — Trung Q Nguyen
(74) *Attorney, Agent, or Firm* — Quarles & Brady LLP

(57) ABSTRACT

A surface profile measuring instrument (1), and method, for measuring the surface profile of a substrate (13). The surface profile measuring instrument (1) comprises an electromagnetic probe (8), the electromagnetic probe (8) comprising a probe tip operable to be brought into proximity with a surface of a substrate (13) to be measured, a drive unit (2) operable to generate a low frequency magnetic field penetrating the surface of the substrate (13), a pick up unit (3) operable to detect the strength of the magnetic field and output a magnetic field strength reading and a computation unit (4) operable to determine a surface profile measurement based on the magnetic field strength reading.

23 Claims, 5 Drawing Sheets

(58) Field of Classification Search
CPC . Y10S 977/873; Y10S 977/872; B21B 38/12; G01R 21/133; G01R 21/06
USPC .......................................... 324/200–207.25
See application file for complete search history.

(56) References Cited

U.S. PATENT DOCUMENTS

| | | | | |
|---|---|---|---|---|
| 5,925,818 | A * | 7/1999 | Cleveland | G01Q 10/06 73/105 |
| 6,545,495 | B2 * | 4/2003 | Warmack | G01R 35/005 850/20 |
| 6,734,670 | B2 | 5/2004 | Crouzen | |
| 2003/0020469 | A1 | 1/2003 | Katragadda et al. | |
| 2010/0175155 | A1 * | 7/2010 | Sahin | G01Q 60/42 850/5 |
| 2012/0043962 | A1 | 2/2012 | Wang et al. | |
| 2014/0053422 | A1 * | 2/2014 | Morley | G01B 7/34 33/501 |

FOREIGN PATENT DOCUMENTS

| | | |
|---|---|---|
| GB | 1162671 | 8/1969 |
| GB | 2142729 | 1/1985 |
| GB | 2475314 | 5/2011 |
| JP | 62299984 | 12/1987 |
| JP | 2001318080 | 11/2001 |

OTHER PUBLICATIONS

Leszek Dziczkowski1, PAMM-Proc. Appl. Math. Mech.10, 605-606 (2010) /DOI10.1002/pamm.201010295.
Yu Feng et al: "Numerical method for calculating the apparent eddy current conductivity loss on randomly rough surfaces", Journal of Applied Physics, American Institute of Physics, US, vol. 95, No. 12, Jun. 15, 2004, pp. 8340-8351, XP01206721.

* cited by examiner

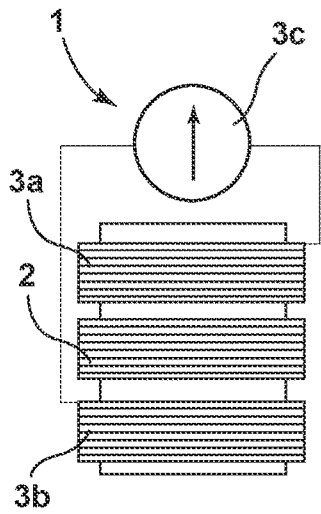 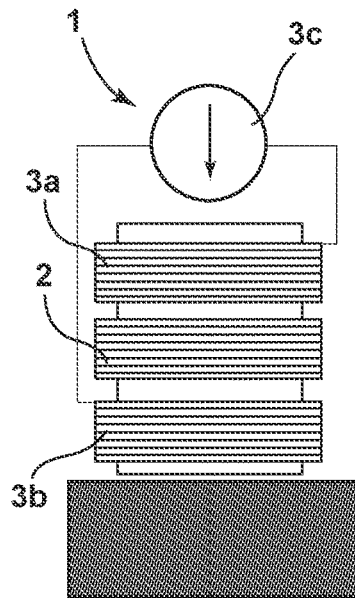 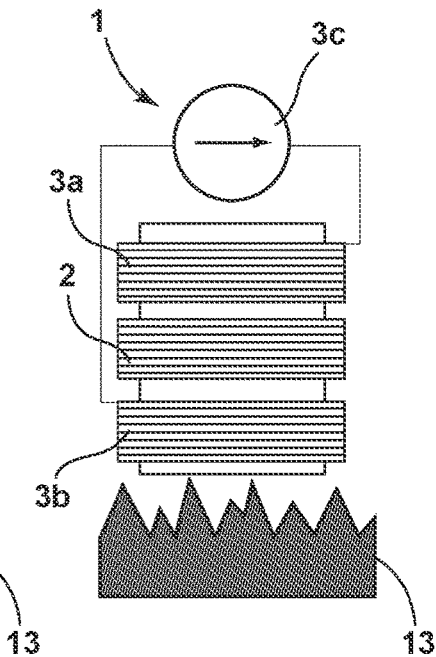
Figure 4a  Figure 4b  Figure 4c
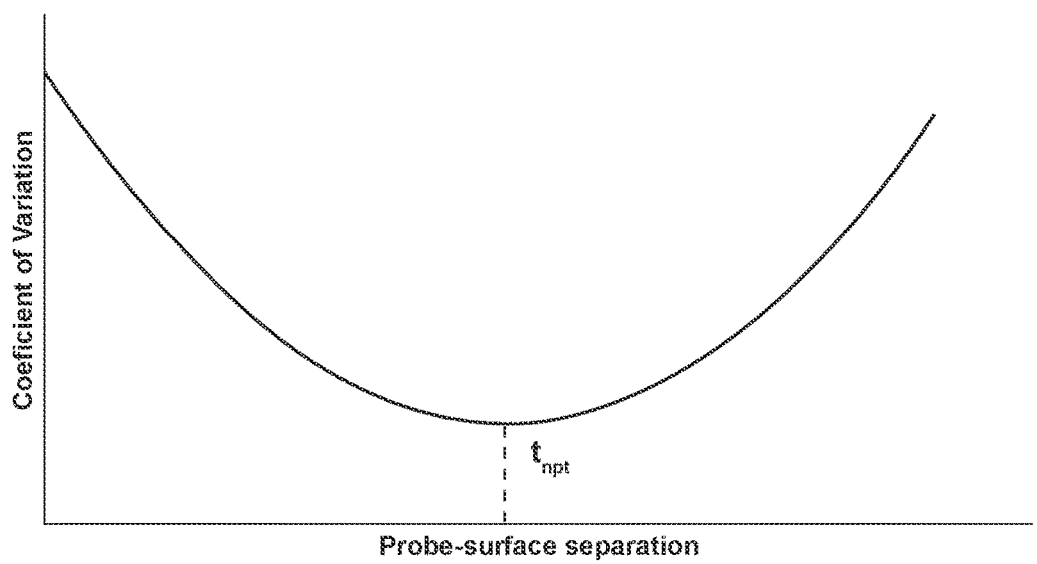
Figure 5

SURFACE PROFILE MEASURING INSTRUMENT AND METHOD

CROSS REFERENCE TO RELATED APPLICATIONS

This application is a U.S. National Stage of PCT Application No. PCT/GB2018/052679 filed on Sep. 19, 2018 which claims the benefit of United Kingdom Patent Application No. 1715079.8, filed on Sep. 19, 2017, the entire contents of which are incorporated herein by reference.

TECHNICAL FIELD OF THE INVENTION

The present invention relates to a surface profile measuring instrument, and method, for measuring the surface profile of a substrate.

BACKGROUND TO THE INVENTION

The surface profile (otherwise known as the surface roughness) of a substrate can dictate many important properties of a substrate, including the friction coefficient of and the ease of adhesion to the substrate. It is therefore useful to determine a measurement of the surface profile of a substrate.

There are several techniques currently used to measure the surface profile of a substrate, all of which have associated disadvantages.

Replica tape involves using compressible foam to obtain an impression of the surface, and then measuring this impression with a micrometer. This technique may be subject to handling issues leading to errors in the measurement. In addition, there is no automatic electronic record of the measurement.

Stylus based instruments drag a fine needle over a surface and measure the deflection of the needle as it moves. Such instruments are highly susceptible to vibrations, and the needle quickly wears. In addition, there is no guarantee that the needle reaches the bottom of troughs on the surface.

Needle probes use a needle to make individual depth measurements of troughs on the surface. However, there is no guarantee that the needle will reach the bottom of every trough measured.

Finally, all three techniques are relatively slow when measuring a large surface area.

An alternative technique to those suggested above is to use a high frequency (MHz) electromagnetic probe to generate eddy currents in the surface of the substrate. Since such eddy currents are affected by the profile of the surface, the strength of the magnetic field generated by the eddy current can give a measurement of the surface profile. While this technique speeds up measuring the surface profile of a large surface area (due to the speed involved in generating and measuring a magnetic field in part of a surface) there are still several issues including a high sensitivity to variances in the conductivity and permeability of the substrate material and the geometry of the substrate having a large amount of influence of the generated eddy currents. The technique therefore has a low signal to noise ratio, which means it is less useful for measuring smoother surfaces with a smaller surface profile measurement value.

Due to the issues noted above, the technique has generally not been adopted to measure surface profile.

It is an object of embodiments of the present invention to overcome or at least mitigate disadvantages with this known technique.

SUMMARY OF THE INVENTION

According to a first aspect of the present invention there is provided a surface profile measuring instrument comprising an electromagnetic probe, the electromagnetic probe comprising a probe tip operable to be brought into proximity with a surface of a substrate to be measured, a drive unit operable to generate a low frequency magnetic field penetrating the surface of the substrate, a pick up unit operable to detect the strength of the magnetic field and output a magnetic field strength reading and a computation unit operable to determine a surface profile measurement based on the magnetic field strength reading.

An electromagnetic probe, for measuring the surface profile of a substrate, which produces a low frequency magnetic field has the advantages of a reduced sensitivity to variances in conductivity and magnetic permeability of the substrate. In addition, the probe will have a high signal to noise ratio, and be less influenced by substrate geometry.

Another possible advantage of low frequency electromagnetic probes for surface profile measurements is that the eddy currents produced by high frequency electromagnetic probes may be influenced by the width and shape of features of the surface, rather than just the height of surface features. These would be additional variables to account for when determining the surface profile measurement. In contrast, low frequency electromagnetic probes, with their reduced eddy current generation, would be less affected by the width and shape of surface features and so produce a measurement which is less influenced by these features.

The probe tip may be operable to be brought into contact with the surface. Alternatively, the probe tip may be brought to a set distance away from the surface. Preferably the set distance may be chosen so as to optimise the coefficient of variation and/or the dynamic range of measurements with the surface profile measuring instrument.

A substrate's surface profile can be inconsistent, with a large variation in the type and size of surface features. These inconsistencies can cause considerable variation in successive surface profile measurements, and also reduce the dynamic range of the probe. Keeping the probe tip a set distance away from the surface increases the surface area of the substrate measured by the probe. Since a larger area of the surface contributes to the measurement, inconsistencies in one part of the surface have less of an effect on the measurement. This reduces the variation between successive measurements.

Additionally, the dynamic range of the probe is dependent on the distance of the probe tip from the surface. The choice of distance therefore affects the dynamic range, which it would be preferable to optimise. This dependency may be the result of the depth of penetration of a surface by the magnetic field.

The surface profile measuring instrument may comprise a spacer operable to maintain the probe tip at a set distance from the surface. The spacer may be operable to allow movement of the probe across the surface. Preferably, the spacer may be operable to allow movement in any direction. Additionally, the spacer may be operable to minimise marks left on the surface. The spacer may comprise at least one thrust roller bearing.

A spacer allows the probe tip to be kept at an optimum distance from the surface. The spacer allowing movement in any direction reduces the time taken to take measurements across the whole surface.

The frequency of the low frequency magnetic field may be up to 1000 Hz, and is preferably in the range 100-500 Hz.

The drive unit may comprise a drive coil. The drive coil may be air cored, ferrite cored or cup cored.

The pick up unit may comprise at least one pick-up coil. The or each pick-up coil may be air cored, ferrite cored or cup cored. The drive coil and the or each pick-up coil may be present on the same core.

The pick up unit may comprise at least two pick-up coils, and the difference between each pick up coil's measurement may be used to determine the surface profile measurement.

Alternatively, the pick up unit may comprise a Hall Effect detector or a giant magnetoresistance detector.

The pick up unit may be operable to output the magnetic field strength reading as a voltage reading.

The computation unit may be operable to determine the surface profile measurement by first obtaining a distance measurement of the apparent distance between the probe tip and the substrate from the magnetic field strength reading, and then converting the distance measurement into the surface profile measurement.

The distance between the probe tip and the substrate directly affects the magnetic field strength reading of the probe, and so can be measured using the magnetic field. A measurement of the distance between the probe tip and the substrate will also vary according to the surface profile of the substrate. In effect, when the probe tip contacts a rough surface, and thus rests on peaks in the surface, the instrument produces an output equivalent to that produced when the probe tip is spaced from a perfectly smooth surface. So, the distance measured by the instrument, less the thickness of any spacer used to space the probe tip from the measured surface, is related to the profile of the surface. Therefore it is possible to obtain a surface profile measurement based on variation in the distance measurement.

The surface profile measurement instrument may comprise a memory unit. The memory unit may be non-volatile memory.

The computational unit may be operable to obtain a distance measurement from the magnetic field strength using calibration values. The calibration values may comprise an offset and/or gain. The calibration values may be obtained from a two-point calibration of the electromagnetic probe. The two-point calibration may comprise the electromagnetic probe taking a distance measurement at each of two known distances from a substrate. The known distances may be determined by placing foils of known thicknesses between the substrate and electromagnetic probe. The calibration values may be stored on the memory unit.

The computation unit may be operable to convert the distance measurement into a surface profile measurement by applying a correction algorithm to the distance measurement. The correction algorithm may comprise a set distance value (or constant) and a correction function. The set distance value be added to or subtracted from the distance measurement and may compensate for a set distance the electromagnetic probe tip is held from the substrate during measurement. The correction function may calculate the surface profile measurement corresponding to the distance measurement. The correction function may comprise a correction factor and/or an offset value. Preferably, the correction algorithm is dynamic. Even more preferably, the correction algorithm is dynamic in that one of a plurality of correction functions are applied to a distance measurement.

The or each correction function may be stored on the memory unit. The or each correction function may be associated with a set range of distance measurements. The correction function applied to the distance measurement may be the correction function associated with a range into which the distance measurement falls. The or each correction function may be generated by measuring a plurality of materials with the electromagnetic probe, each material having a known surface profile, and deriving the relationship between the measurements and surface profile. Preferably, the or each correction function may be generated and stored on the memory unit as part of the factory settings of the electromagnetic probe.

Alternatively the computation unit may be operable to obtain a surface profile measurement from the magnetic field strength using calibration values. In such embodiments, the two-point calibration may comprise the electromagnetic probe taking a surface profile measurement on each of two surfaces with different, and known, surface profiles. The known surface profiles may be determined by any other surface profile measurement technique. The surfaces may comprise foils.

The surface profile measuring instrument may be operable to store surface profile measurements on the memory unit. The surface profile measuring instrument may be operable to take multiple surface profile measurements across the surface of the substrate. Preferably, the computation unit may be operable to determine and output an average of the multiple surface profile measurements. The average may comprise the mean value.

The surface profile measuring instrument may be operable to be dragged along the surface of the substrate. Preferably, the surface profile measuring instrument may be operable to measure the surface profile at set intervals as it is being dragged along the surface of the substrate.

The computation unit may be operable to choose one of a plurality of correction algorithms to be applied to the distance measurement, each correction algorithm being associated with a standard of profile measurement. The choice of correction algorithm applied may be based on the associated standard.

There are multiple standards for surface profile measurements. Examples include arithmetical average roughness ($R_a$) and ten-spot average roughness ($R_z$). Having correction algorithms for different standards allows the electromagnetic probe to measure the surface profile and output a result in whichever standard the user prefers.

The surface profile measuring instrument may comprise an output unit operable to display the surface profile measurement. Preferably, the output unit is operable to display the average as a profile reading. The output unit may comprise a display screen.

The surface profile measuring instrument may comprise an input unit operable to receive inputs from a user. The input unit may comprise a keypad and/or touch screen.

The computation unit may be a microprocessor. Additionally or alternatively the computation unit may be programmable.

According to a second aspect of the present invention there is provided a method of measuring the surface profile of a substrate comprising the steps of bringing a probe tip of an electromagnetic probe of a surface profile measuring instrument into proximity with the surface of the substrate to be measured, generating a low frequency magnetic field penetrating the surface of the substrate, detecting the strength of the magnetic field, outputting a magnetic field strength reading and determining a surface profile measurement based on the magnetic field strength reading.

The method of the second aspect of the present invention may involve the use of and/or incorporate any or all features of the apparatus of the first aspect of the present invention, as desired or appropriate.

DETAILED DESCRIPTION OF THE INVENTION

In order that the invention may be more clearly understood one or more embodiments thereof will now be described, by way of example only, with reference to the accompanying drawings, of which:

Figure 1:
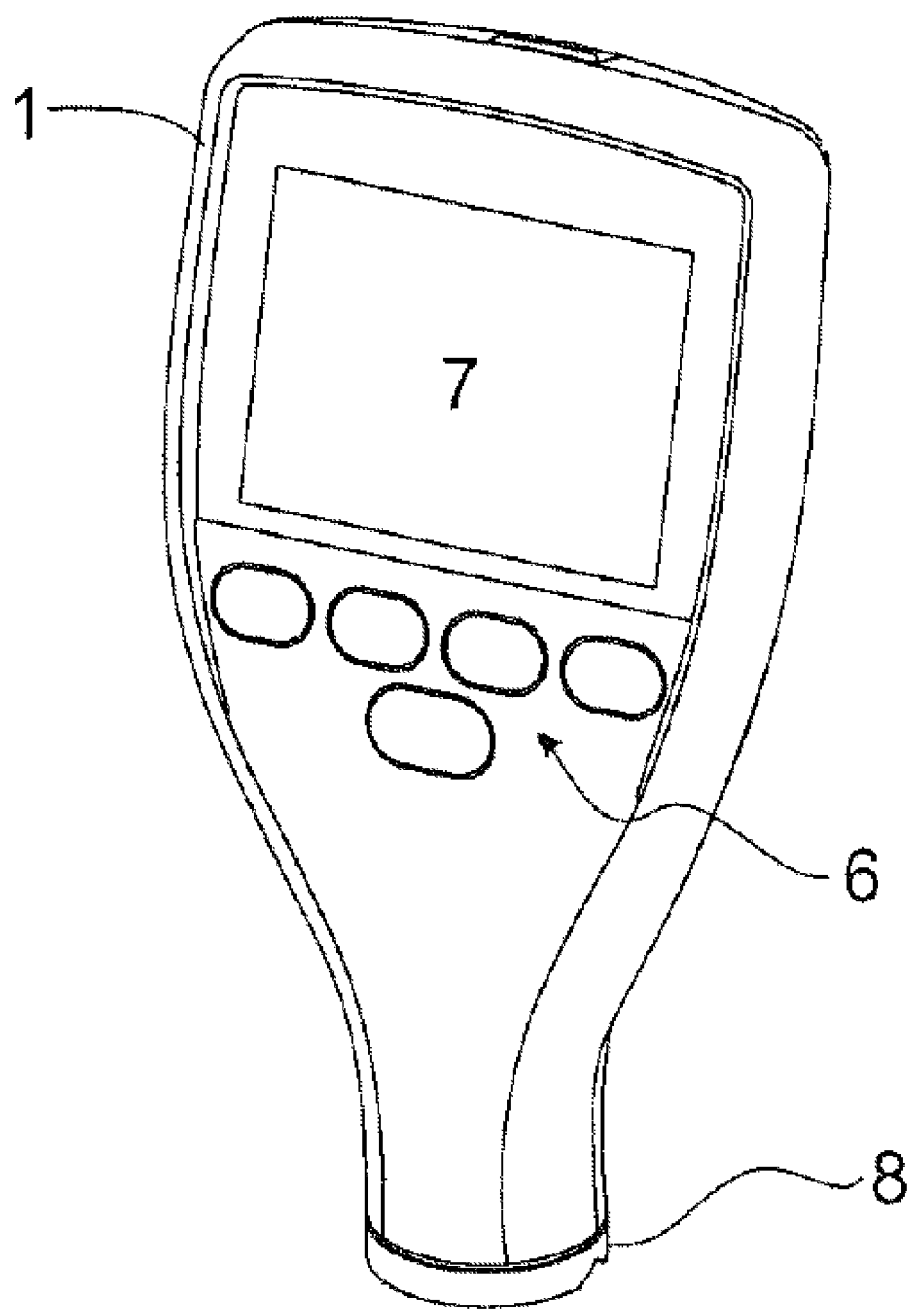
FIG. 1 shows an embodiment of the surface profile measuring instrument.
Figure 2:
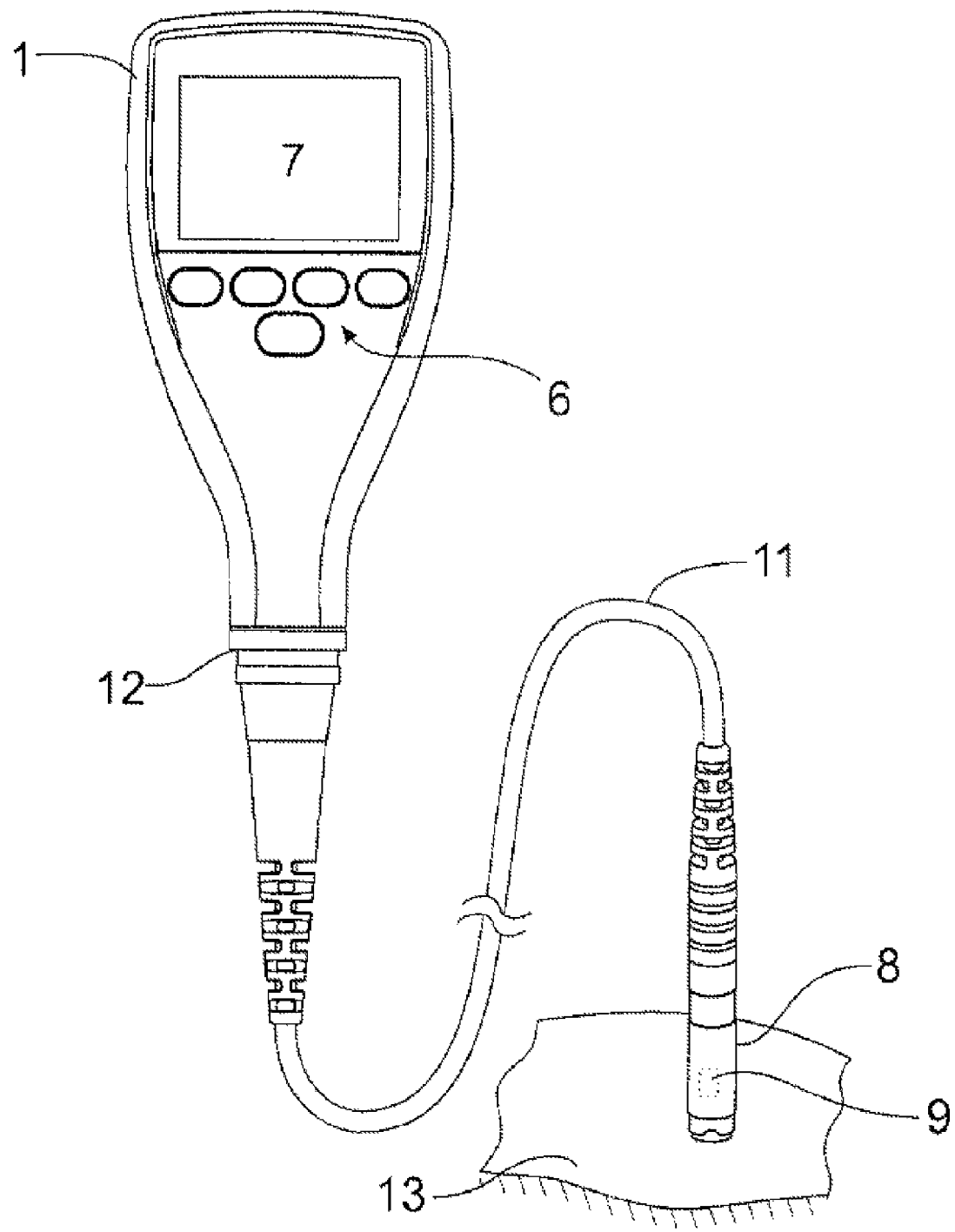
FIG. 2 shows an alternative embodiment of the surface profile measuring instrument.
Figure 3:
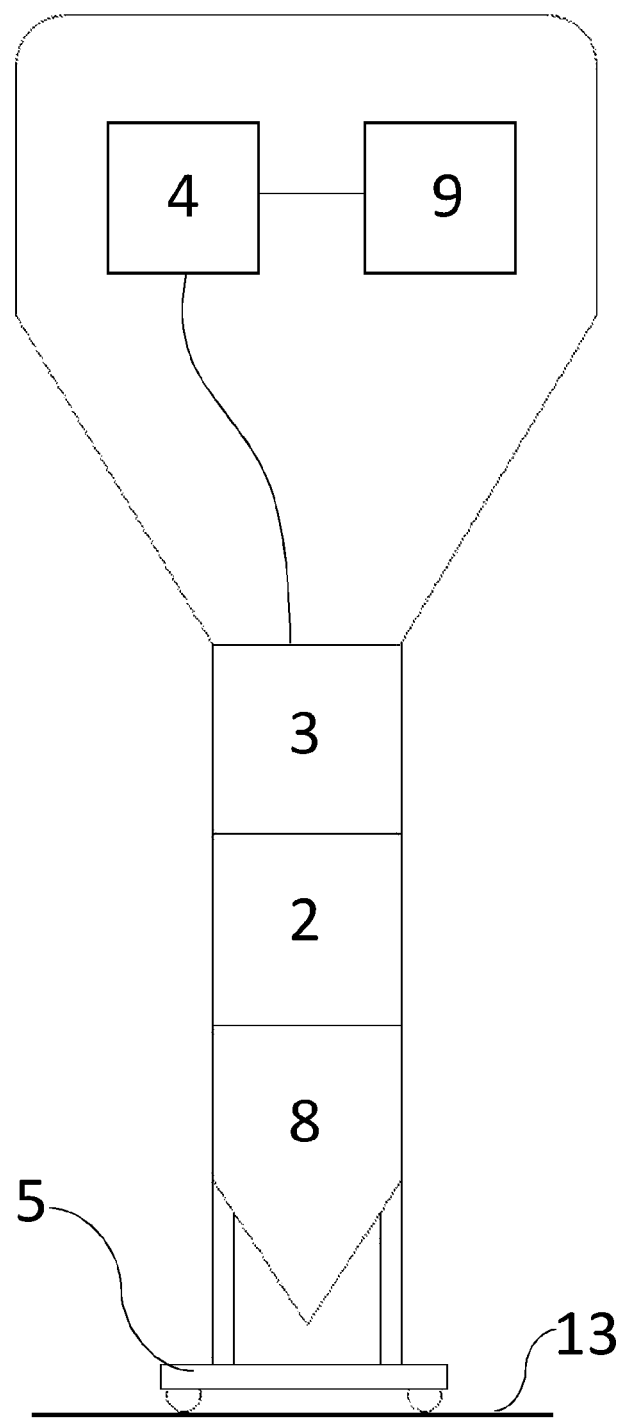
FIG. 3 shows a further view of the embodiment of the surface profile measuring instrument as shown in FIG. 1.
Figure 6:
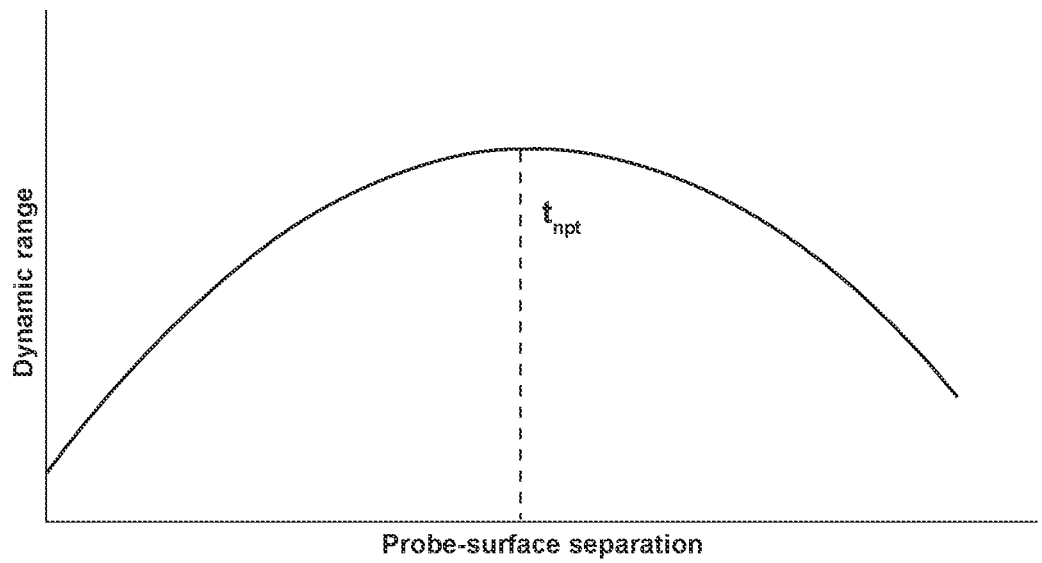
Figure 7:
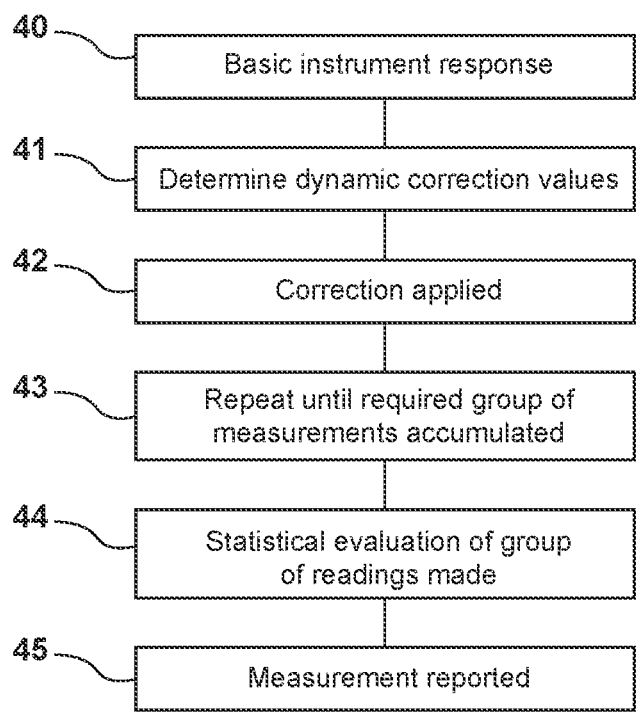

FIGS. 4a-c are diagrams demonstrating the response of the surface profile measuring instrument of FIG. 1, 2 or 3 to various substrates;

FIG. 5 is a graph showing the relationship between probe-surface separation and the coefficient of variation;

FIG. 6 is a graph showing the relationship between probe-surface separation and the dynamic range; and FIG. 7 is a block diagram of how the surface profile measuring instrument of FIG. 1, 2 or 3 generates a surface profile measurement.

As shown in FIG. 1, a surface profile measuring instrument 1 comprises an electromagnetic probe 8 operable to measure the surface profile of a substrate, an output unit 7 comprising a display screen operable to output the measurement and an input unit 6 comprising a keypad operable to receive inputs from the user. The instrument 1 also comprises a computation unit 4, as shown in FIG. 3. FIG. 2 shows an alternative embodiment of the surface profile measuring instrument 1, wherein the probe 8 is attached to the instrument 1 via an electrical fitting 12 and an electrical cable 11. In this embodiment the probe 8 is shown in contact with a substrate 13 to be measured. In addition, the instrument 1 comprises a memory unit 9 comprising non-volatile memory, found within the probe 8. In alternative embodiments, the memory unit 9 may be found within the body of the instrument 1.

As shown in FIGS. 4a-c, in use the surface profile measurement instrument 1 is brought into proximity with substrate 13. The instrument 1 comprises a drive unit 2 and pick up unit 3: in the embodiment shown, these comprise a drive coil and a first pick up coil 3a and second pick up coil 3b, respectively. Once the instrument 1 is within proximity of the substrate 13, the user can cause, by making an input via keypad 6, the instrument 1 to begin measuring the surface profile. In response to the input, the drive coil 2 will generate a magnetic field with a frequency in the range 100 Hz to 500 Hz which penetrates the substrate 13. Each pick up coil 3a measures the strength of the magnetic field generated. The response of each pick up coil is affected by how close a ferrous material is to it. Since one pick up coil is closer to the substrate 13 than the other (and the substrate 13 is ferrous) the magnetic field reading of each pick up coil will be different from the other. It is well known in the art that the pick up unit 3, here visualised as including a voltage meter 3c, can use the difference in the magnetic field strength readings of the pick up coils to obtain a magnetic field strength reading of the field penetrating the substrate 13.

Alternatively, the pick up unit 3 may comprise any sensor suitable for detecting magnetic field strength, including an absolute pick up coil, a hall effect sensor and a GMR sensor. The or each coil can be air cored, ferrite cored or cup cored.

Since a low frequency magnetic field is used, the substrate 13 must be ferrous for the magnetic field strength penetrating the substrate 13 to result in a change in the magnetic field strength in comparison to the magnetic field through air.

In the past the voltage reading generated has been used to measure the distance between the probe 8 and the substrate 13, e.g. to measure thickness of a coating on the substrate since the further the substrate 13 is from the probe the less the magnetic field will penetrate the substrate 13 and so the lower the resulting voltage reading. However, the surface profile of the substrate 13 will also effect the voltage reading, since troughs in the surface will cause some parts of the substrate 13 to be further from the probe 8 than others. The larger and more frequent these troughs, the less the magnetic field penetrates the substrate 13 and the lower the resulting voltage reading.

This is shown in FIGS. 4a-c. In FIG. 4a, there is no substrate present: in this case the magnetic field strength penetrating the substrate is zero, and so the voltage reading is zero. For smooth substrates, as shown in FIG. 4b, the magnetic field penetrates more of the substrate 13 and so results in a high voltage reading. For rougher substrates, as shown in FIG. 4c, the magnetic field penetrates less of the substrate 13 and so the voltage reading is lower.

Preferably, when measuring the surface profile of a substrate 13 the probe tip of probe 8 is kept at a set distance from the surface of the substrate 13. This distance may be introduced by a spacer 5, as shown in FIG. 3. Preferably the spacer comprises a thrust bearing. As shown in FIGS. 5 and 6, the distance, $t_{opt}$, is chosen based on the distance which minimises the coefficient of variation of the instrument 1 while maximising the dynamic range of the instrument 1. When the probe 8 is closer to the surface of the substrate 13, a smaller area of the surface of the substrate 13 is penetrated by the magnetic field. This results in individual surface features of the substrate 13 having a larger effect on the voltage reading. This can result in a large variation in voltage readings across multiple measurements of the same substrate 13. This large variation also introduces a high degree of noise into the readings. Keeping the instrument 1 at a distance from the substrate 13 means the magnetic field penetrates a larger surface area of the substrate 13, and so individual surface features have less of an effect on the voltage reading. An optimum distance, $t_{opt}$, can be calculated by balancing the high variation and low dynamic range experienced when a measurement is made with the probe tip close to the surface of the substrate 13 against the low signal (and thus low signal to noise ratio) when the probe tip is further from the surface.

Additionally, the dynamic range of the instrument 1 is dependent upon the distance from the surface, with there being an optimum distance so as to maximise dynamic range. This optimum distance may be associated with an optimum depth of penetration of the magnetic field into the surface.

Once the instrument 1 has obtained a magnetic field reading, the computation unit 4 is operable to convert the reading into a basic instrument response. This basic instrument response can be a distance measurement which is then converted into a surface profile measurement.

Calculating a distance measurement from a magnetic field reading is known and so will not be described in further detail. In practice it can be achieved by use of a look up table.

In this embodiment a distance measurement is obtained using calibration values derived from a calibration process. This calibration process can be carried out in the factory in which the instrument 1 is made. Alternatively or additionally, the calibration process can be carried out by the user to create or replace calibration values. Once the calibration process is carried out, the calibration values generated are stored in the memory unit 9 for future use. In one embodiment, the calibration values are given by a two-point calibration. The two-point calibration comprises the instrument 1 carrying out two measurements on a substrate 13, each measurement being at a different known distance from the surface of the substrate 13, by inserting a foil of know thickness between the tip of the probe 8 and the substrate 13 and taking a measurement with the foil sandwiched between the probe tip and the surface.

Alternatively, if the basic instrument response comprises a surface profile measurement, the surface profile measurement can also be obtained using calibration values from a calibration. In such cases, the calibration values can be given by a two-point calibration, comprising the instrument 1 carrying out measurements on two foils, each foil having a different, known, surface profile (determined by any current method of measuring surface profiles).

Once the computation unit 4 obtains the basic instrument response comprising a distance measurement, a correction algorithm is applied to the response so as to obtain a surface profile measurement. The algorithm comprises a correction function and an optimum separation value. The optimum separation value matches the distance any spacer holds the tip of the probe 8 from the surface of the substrate 13, and is subtracted from the basic instrument response to account for this distance. The correction function is based on the increased basic reading that is obtained when a perfectly smooth surface is replaced with a rough surface, and adjusts the basic instrument response into a surface profile measurement. Preferably the correction function is an offset value which is added to or subtracted from the instrument response, although it may, additionally or alternatively, comprise a correction factor.

In one embodiment the algorithm is dynamic, in that there may be multiple correction functions which can be chosen, each for a different associated range of basic instrument responses. In such cases the correction function is chosen based on which range the basic instrument response falls within. The or each correction function is empirically derived, by measuring the basic instrument response of the instrument 1 when a plurality of measurements are taken on surfaces, each surface having a different known surface profile. The known surface profile of each surface can be determined by any suitable method, including arithmetical average roughness and ten-spot average roughness. The or each derived correction function is stored on the memory unit 9. Preferably, the derivation of the or each correction function is derived in the factory when setting up the instrument 1.

In one embodiment, there are multiple correction algorithms, each algorithm associated with the method used to measure the surface profiles when the or each corresponding correction function was derived. A user of the instrument 1 may then select, via input unit 6, a method standard in which to measure the surface profile. The computation unit 4 will then select the correction algorithm associated with the chosen method standard.

When calibrating the instrument 1, the calibration points may be chosen so as to correlate with the range of possible surface profile measurements, so as to minimise linearization errors. If the range of possible surface profile measurements dictates multiple correction functions (each with a different range) must be used, then the calibration method may be a multiple point calibration including midrange calibration points. Preferably the midrange calibration points align with the end points of each correction function's range.

So as to determine the surface profile across a whole surface of a substrate 13, the instrument 1 can be used to take multiple measurements, each measurement at a different point on the surface. An average can then be calculated from the multiple measurements. As shown in FIG. 7, each measurement results in a basic instrument response (40), to which dynamic correction values are determined (41) and then applied (42). This is repeated until a desired number of measurements, as indicated by the user via the input device 6, are reached (43). The average of the measurements is then determined (44). Preferably, the mean is determined. The average is then outputted via the output device 7 to the user, as a profile reading (45).

The or each surface profile measurement may be stored on the memory unit 9. In addition, the or each profile reading may be stored on the memory unit 9.

In a preferred embodiment, the spacer allows the probe 8 to move in any direction along the surface of the substrate 13, allowing multiple measurements to be made relatively quickly.

The above embodiments are described by way of example only. Many variations are possible without departing from the scope of the invention as defined in the appended claims.

The invention claimed is:

1. A surface roughness measuring instrument comprising an electromagnetic probe, the electromagnetic probe comprising a probe tip operable to be brought into proximity with a surface of a substrate to be measured, a drive unit operable to generate a low frequency magnetic field penetrating the surface of the substrate, a pick up unit operable to detect the strength of the magnetic field and output a magnetic field strength reading reflecting the strength of the magnetic field penetrating the surface of the substrate and a computation unit operable to determine the surface roughness measurement for an area of the surface from the magnetic field strength reading, wherein the pick up unit comprises at least a first pick up coil and a second pick up coil, and is operable to use the difference between the first and second pick up coils to determine the strength of the magnetic field penetrating the surface of the substrate, and wherein the first pick up coil is located a first distance from a drive coil in a first direction, the second pick up coil is located the first distance from the drive coil in a second direction, the second pick up coil is located closer to the surface of the substrate than the first pick up coil, and both of the first and second pick up coils are located on a same side of the surface being measured.

2. A surface roughness measuring instrument as claimed in claim 1 wherein the probe tip is operable to be brought to a set distance away from the surface.

3. A surface roughness measuring instrument as claimed in claim 2 wherein the set distance is chosen so as to optimise the coefficient of variation and/or the dynamic range of measurements with the surface roughness measuring instrument.

4. A surface roughness measuring instrument as claimed in claim 2, comprising a spacer operable to maintain the probe tip at the set distance from the surface.

5. A surface roughness measuring instrument as claimed in claim 4, wherein the spacer may be operable to allow movement of the probe across the surface.

6. A surface roughness measuring instrument as claimed in claim 1 wherein the computation unit is operable to determine the surface roughness measurement by first obtaining a distance measurement of the apparent distance between the probe tip and the substrate from the magnetic field strength reading, and then converting the distance measurement into the surface roughness measurement.

7. A surface roughness measuring instrument as claimed in claim 6 wherein the computation unit is operable to convert the distance measurement into a surface roughness measurement by applying a correction algorithm to the distance measurement.

8. A surface roughness measuring instrument as claimed in claim 7 wherein the correction algorithm is dynamic, wherein one of a plurality of correction functions are applied to a distance measurement.

9. A surface roughness measuring instrument as claimed in claim 7 wherein the or each correction function is associated with a set range of distance measurements.

10. A surface roughness measuring instrument as claimed in claim 9 wherein the correction function applied to the distance measurement is the correction function associated with a range into which the distance measurement falls.

11. A surface roughness measuring instrument as claimed in claim 7, wherein the computation unit is operable to allow one of a plurality of correction algorithms to be chosen and applied to the distance measurement, each correction algorithm being associated with a standard of roughness measurement.

12. The instrument of claim 1, wherein the surface roughness measurement determined by the computational unit is an average surface roughness measured over an area of the substrate.

13. The instrument of claim 12, wherein the average surface roughness is determined by one of arithmetical average roughness or ten-spot average roughness.

14. The instrument of claim 1, wherein the substrate is a ferrous material.

15. The instrument of claim 1, wherein the drive unit is operable to generate a low frequency magnetic field in the range of 100-500 Hz penetrating the surface of the substrate.

16. A method of measuring the surface roughness of a substrate comprising the steps of bringing a probe tip of an electromagnetic probe of a surface roughness measuring instrument into proximity with the surface of the substrate to be measured, generating a low frequency magnetic field penetrating the surface of the substrate with a drive coil, detecting the strength of the magnetic field penetrating the surface of the substrate by measuring the difference between the outputs of two pick up coils located on the same side of the surface at a first and a second distance from the surface, where the pick up coils are located on either side of the drive coil, outputting a magnetic field strength reading reflecting the strength of the magnetic field penetrating the surface of the substrate and representing a surface roughness measurement of an area of the surface and determining a surface roughness measurement of an area of the surface from the magnetic field strength reading based on the difference between the outputs of the two pick up coils.

17. A method of measuring the surface roughness of a substrate as claimed in claim 16 wherein the probe tip is brought to a set distance away from the surface.

18. A method of measuring the surface roughness of a substrate as claimed in claim 17 wherein the set distance is chosen so as to optimise the coefficient of variation and/or the dynamic range of measurements with the surface roughness measuring instrument.

19. A method of measuring the surface roughness of a substrate as claimed in claim 16 wherein determining the surface roughness measurement comprises first obtaining a distance measurement of the apparent distance between the probe tip and the substrate from the magnetic field strength reading, and then converting the distance measurement into the surface roughness measurement.

20. A method of measuring the surface roughness of a substrate as claimed in claim 19 wherein converting the distance measurement into a surface roughness measurement comprises applying a correction algorithm to the distance measurement.

21. A method of measuring the surface roughness of a substrate as claimed in claim 20 wherein the correction algorithm is dynamic, wherein one of a plurality of correction functions are applied to a distance measurement.

22. A method of measuring the surface roughness of a substrate as claimed in claim 20 wherein the or each correction function is associated with a set range of distance measurements.

23. A method of measuring the surface roughness of a substrate as claimed in claim 22 wherein the correction function applied to the distance measurement is the correction function associated with a range into which the distance measurement falls.

\* \* \* \* \*